April 19, 1960  N. H. McDIARMID  2,933,340
PARACHUTE RELEASE COUPLING
Filed April 10, 1957  4 Sheets-Sheet 1

INVENTOR
NEIL H. McDIARMID

BY Mead, Browne, Schuyler & Beveridge
ATTORNEY

April 19, 1960 N. H. McDIARMID 2,933,340
PARACHUTE RELEASE COUPLING
Filed April 10, 1957 4 Sheets-Sheet 2

INVENTOR
NEIL H. McDIARMID
BY Mead, Browne, Schuyler & Beveridge
ATTORNEY

April 19, 1960  N. H. McDIARMID  2,933,340
PARACHUTE RELEASE COUPLING
Filed April 10, 1957  4 Sheets-Sheet 3

INVENTOR
NEIL H. McDIARMID
BY Mead, Browne, Schuyler + Beveridge
ATTORNEY ated Apr. 19, 1960

2,933,340
PARACHUTE RELEASE COUPLING

Neil H. McDiarmid, Vancouver, British Columbia, Canada

Application April 10, 1957, Serial No. 651,860

8 Claims. (Cl. 294—83)

This invention relates to coupling assemblies and more particularly to a coupling assembly operable to disconnect a cargo load from a parachute when the load is landed.

Coupling assemblies for the foregoing purpose have been known in the art, but due to the peculiar problems involved many prior assemblies have proved to be impractical for their intended purpose. The major requirements of such a device are that it maintain a positive coupling between the parachute and the load while the load is airborne and yet swiftly release the coupling to separate the load and the parachute when the load strikes the ground. Satisfaction of one of the foregoing requirements is often achieved at the expense of the other. Many couplings which are satisfactory from a theoretical standpoint are economically impractical because of precise machining requirements of the necessity of many complex parts.

It is a primary object of my invention to provide a parachute release coupling in which a positive coupling engagement is assured. A second object, ancillary to the foregoing object, is to provide a parachute release coupling wherein the intensity of coupling engagement between the separable parts is directly proportional to the magnitude of the load supported by the parachute.

Another object of my invention is to provide a parachute release coupling capable of quickly uncoupling the load from the parachute upon the reduction of the load below a predetermined minimum.

Still another object of my invention is to provide a parachute release coupling wherein the nature of the various parts is such as to obviate the necessity of precise machining operations.

In the attainment of the foregoing objects, one of the features of my invention resides in the provision of a plurality of pivotally mounted latch members located around the sides of a coupling member receiving passage. When in engagement with the coupling member, the latch members project upwardly and inwardly with respect to the point of pivotal support. Thus, any force tending to draw the coupling member downwardly with respect to the latch members tends to pivot the latch members inwardly toward the coupling member, thus increasing the intensity of engagement therebetween. In practice, this force is occasioned by the supporting of the load from the parachute, the element upon which the latch members are mounted being suspended from the parachute while the coupling member is directly connected to the load. The latch members are preferably biased away from each other and, in the absence of any load upon the coupling member, would be moved to a position out of engagement with the coupling member to thereby release the coupling member. By providing a substantial amount of bias to the latch members, the coupling assembly may be set to release at some magnitude of load substantially greater than zero, and by selecting appropriate biasing forces the coupling may be set to be released at a desired percentage of the load to be supported.

Other features of my invention relate to an efficiently operating cam mechanism whereby a plurality of latch members may be simultaneously and manually moved into engagement with the coupling member against the action of the biasing means. Still another feature of my invention resides in the provision of means for preventing premature releasing of the coupling during the period before the parachute supports the flow.

Other objects and features of my invention will become apparent by reference to the following specification taken in conjunction with the accompanying drawings.

Figure 1:
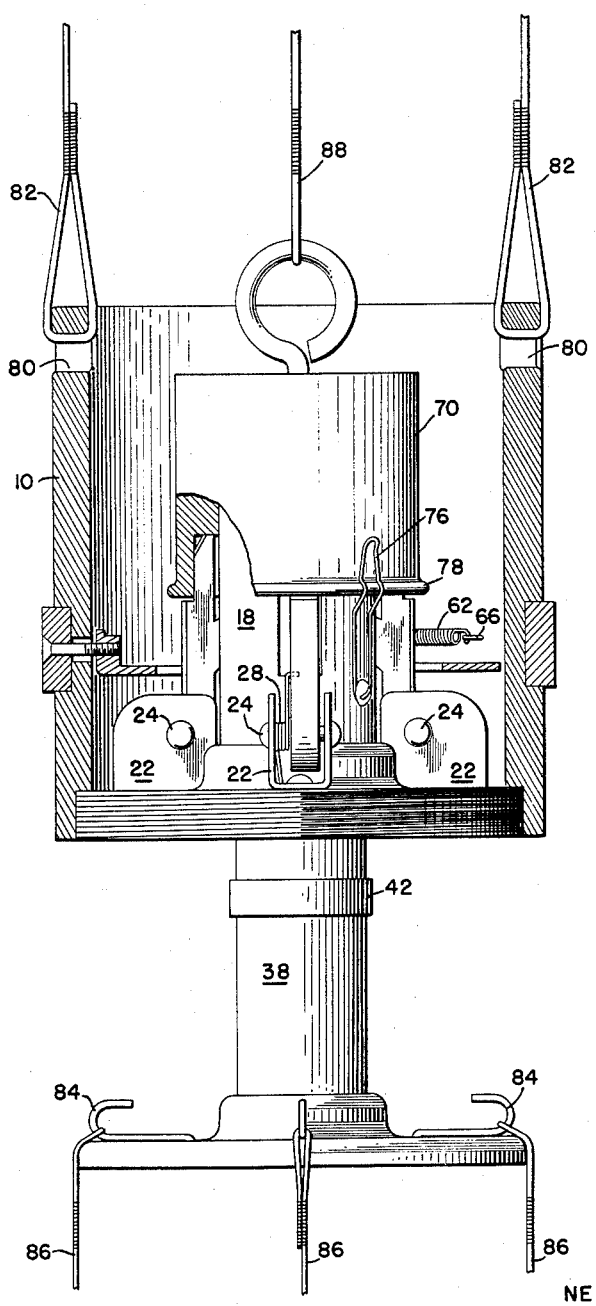
Fig. 1 is a partial cross-sectional view taken vertically through the outer portion of a parachute release coupling embodying the invention, the exterior of the inner latch mechanisem being shown.

Referring to the drawings, the coupling assembly comprises a cylindrical outer casing 10 having an annular base member 12 secured to one end thereof by any suitable means, for example, by threaded engagement as at 14. Base member 12 is provided with a central tapped opening 16 which receives a tubular guide member 18 and fixedly supports member 18 concentrically within casing 10.

Guide member 18 is of hollow tubular form, its interior wall defining a coupling member receiving passage 20.

A plurality of brackets 22 are fixedly supported upon base 12 at symmetrically disposed positions around guide member 18. Brackets 22 serve to support pivot pins 24 which in turn support latch members 26 for pivotal movement toward and away from the central axis of guide member 18 in vertical planes passing through said axis. Latch members 26 are constantly biased, as best seen in Fig. 3, away from the central axis of member 18 by torsion springs 28 acting between bracket 22 and member 26.

Figure 3:
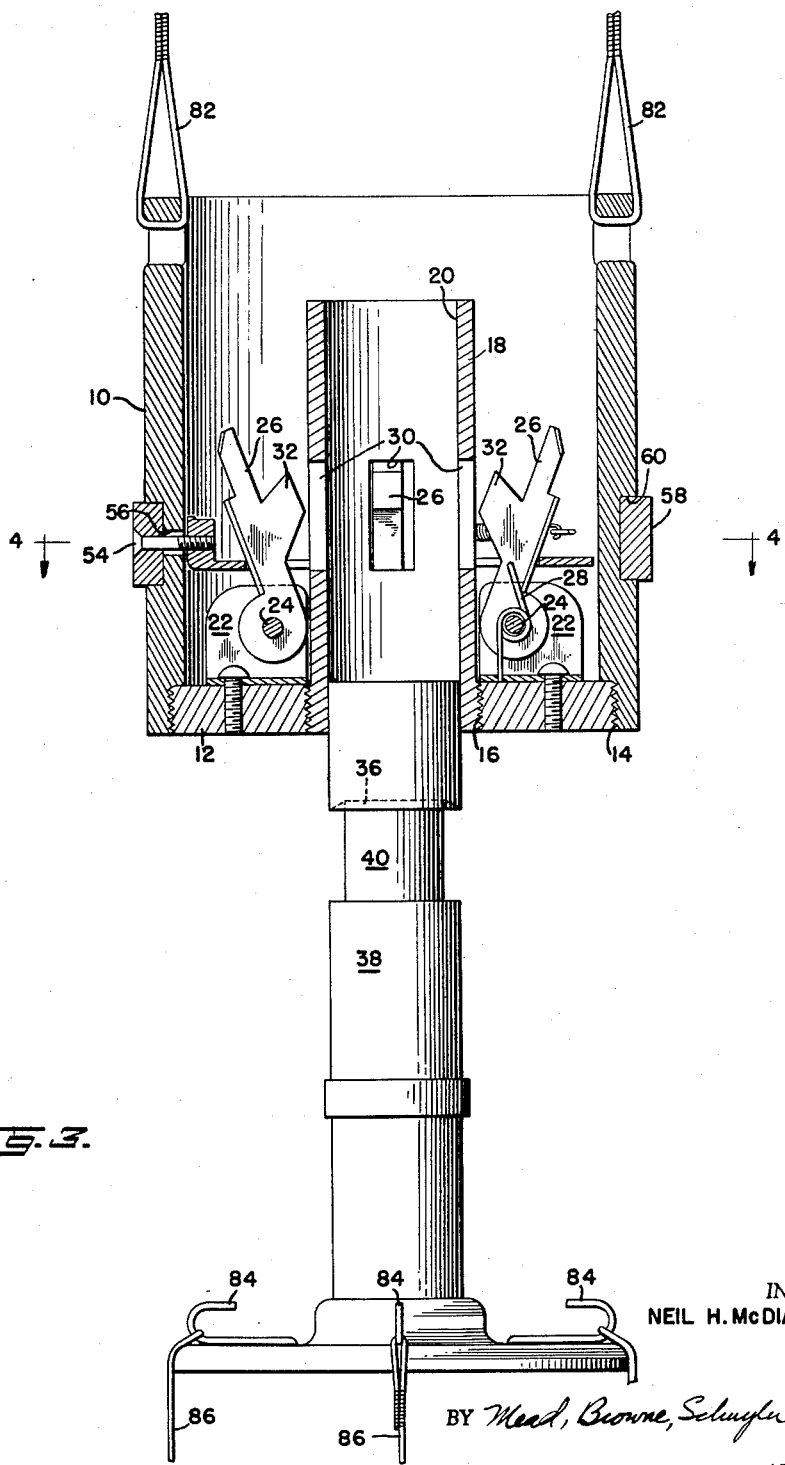
Fig. 3 is a cross-sectional view similar to Fig. 2 showing the parts in their coupling release position.

As best appreciated from Fig. 3, guide member 18 is provided with a series of longitudinally extending slots 30 which pass through the wall of member 18 to permit projecting teeth 32 on latch members 26 to project into the interior of passage 20 when the latch members are pivoted toward the axis of member 18.

The upper surfaces 34 of teeth 32 are inclined upwardly so that when the teeth project into passage 20, their upper surfaces 34 may lie in face to face engagement with downwardly facing shoulder 36 of coupling member 38.

Figure 2:
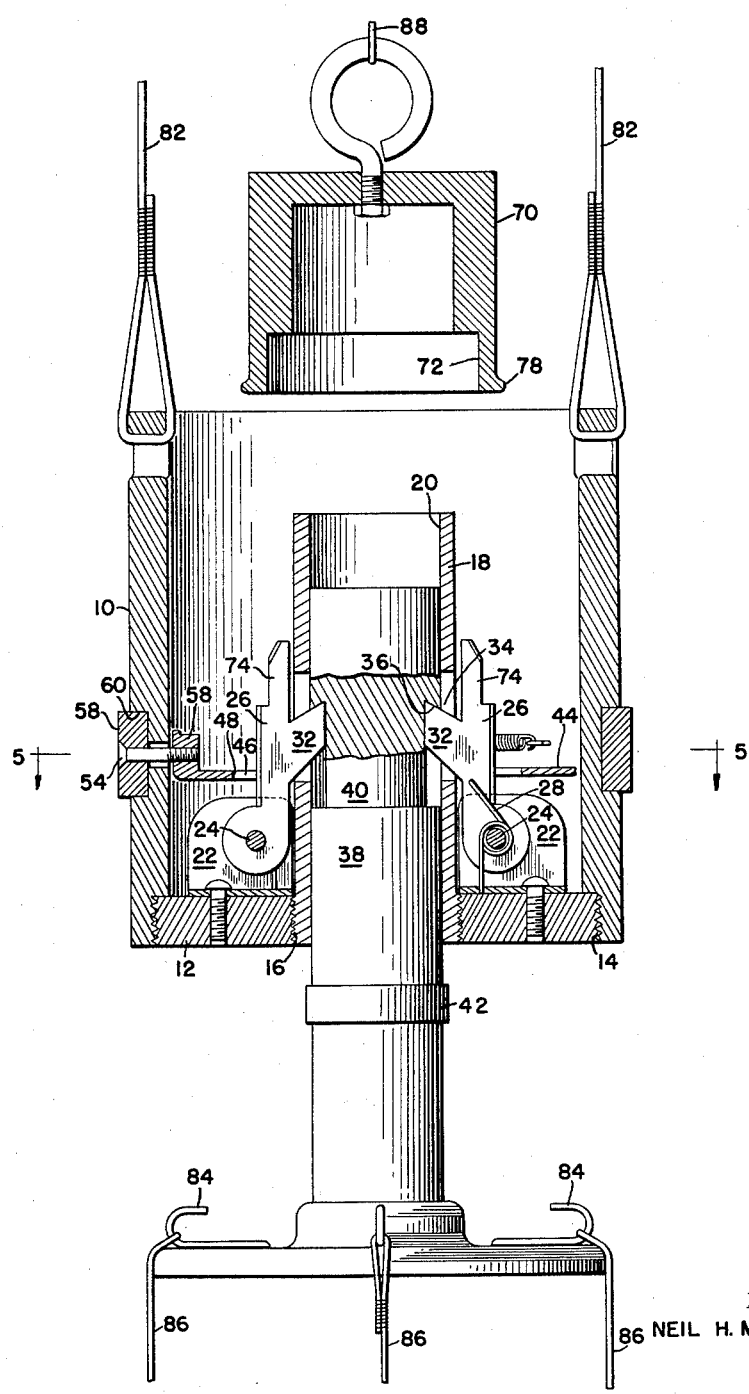
Fig. 2 is a longitudinal cross-sectional view taken on a vertical plane passing through the center line of my parachute release coupling, showing the parts in their coupling position.

As best seen in Fig. 2, coupling member 38 fits within passage 20 reasonably closely to prevent cocking or tilting of member 38 with respect to passage 20. The fit however is loose enough to permit free axial sliding movement of coupling member 38 relative to the passage 20. The cross-sectional shape of member 38 and passage 20 is complementary (circular in the disclosed embodiment). Shoulder 36 is formed by providing a reduced diameter section 40 and the coupling member may, if desired, be provided with a stop collar 42 to assist in axially aligning reduced diameter portion 40 with slots 30 in member 18. Shoulder 36 is inclined inwardly and upwardly with respect to the longitudinal axis of the coupling member at an angle which is chosen in accordance with the desired releasing characteristics of the coupling, discussed more fully below.

Figure 4:
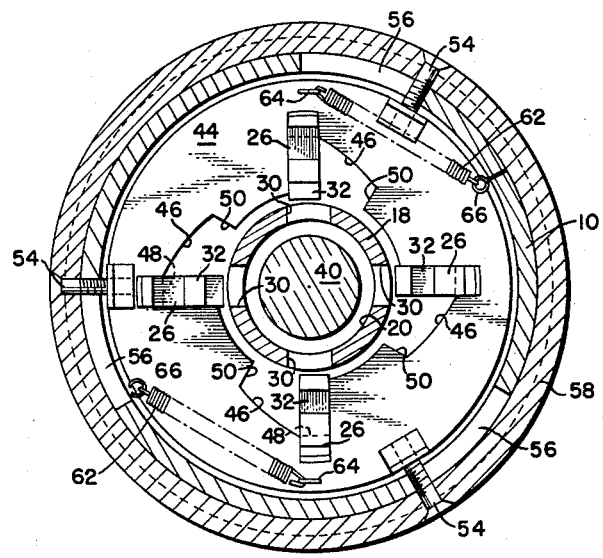
Figs. 4 and 5 are cross-sectional views taken at the line 5—5 of Fig. 2 showing the latch member camming means respectively in its rest and latch member engaging position.
Figure 5:
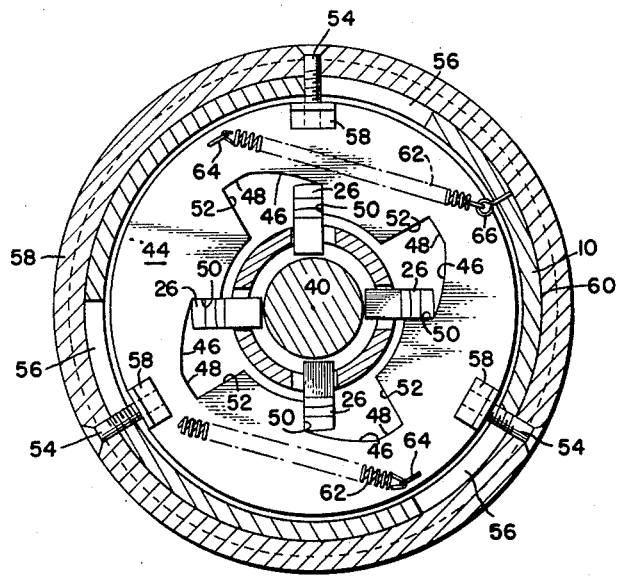

To simultaneously move all of latch members 26 from the normal or released position shown in Fig. 3 to the latching or coupling member engaging position shown in Fig. 2, I have provided a horizontally disposed cam plate 44, best seen in Figs. 4 and 5. Fig. 4 shows cam plate 44 and latch members 26 located in their normal or rest positions. In the plan view shown in Fig. 4, cam plate 44 might be best described as a flat, annular sheet in which the cam portions are defined by indentations extending radially outward from the inner periphery of the annulus. An individual cam portion is provided for each of latch members 26 and curves radially inwardly toward the axis of passage 20 in its extent from rest portion 48 to stop surface 50. Thus, as cam plate 44 is moved in a clockwise rotation from the position shown in Fig. 4 to the position shown in Fig. 5 the curved cam surface 46 drives its associated latch member 26 radially inward to position tooth portion 32 within passage 20. Cam plate 44 may be rotated about the axis of passage 20 between limits defined by stop surface 50 and stop surface 52 which engage the side surfaces of latch members 26 to thereby limit rotation of plate 44.

Plate 44 is supported for rotation upon casing member 10 by bolts 54 which pass through slots 56 in casing 10. Bolts 54 are secured into brackets 58 fixedly secured to plate 44 and are also secured within an annular collar 58 mounted for rotation in an annular groove 60 in the external surface of casing member 10.

Cam plate 44 is normally biased to the position shown in Fig. 4 by tension springs 62 which are connected between eyes 64 secured to cam plate 44 and eyes 66 suitably located upon the interior surface of casing member 10.

Because of the respective biasing actions exerted by springs 62 and 28, latch members 26 would normally locate themselves in the position shown in Figs. 3 and 4. To maintain latch members 26 in their coupling member engaging position until the application of a load upon coupling member 38 sufficient to overcome the biasing action of spring 28, I have provided a cup-like retaining member 70 (Figs. 1 and 2) having an enlarged diameter counterbore 72 extending inwardly from its open end. Counterbore 72 is of such a diameter as to permit member 70 to be slipped downwardly over the upper ends of latch members 26 when they are in their coupling member engaging position to thereby prevent pivotal movement of latch members 26 away from coupling member 38. Latch members 26 are preferably formed with a shoulder 74 at their upper ends for engagement within counterbore 72. To yieldingly retain member 70 in position to engage latch members 26, a spring clip 76 may be mounted upon the outer surface of member 18 to restrain upward movement of member 70 by engagement of clip 76 with an annular flange 78 formed around the lower end of member 70.

When employed in the embodiment of a parachute release coupling, casing 10 is provided with suitable means for securing the casing to the shroud lines of the parachute as by openings 80 through which the shroud line 82 may be passed and secured. Coupling member 38 is likewise provided at its lower end with any suitable means such as hooks 84 to which the load (not shown) may be attached as by lines 86. Member 70 is connected by line 88 to a shroud line or a portion of the parachute itself. The line 88 is of such length that opening of the parachute causes member 70 to be lifted from its latch member engaging position of Fig. 1 to a second position clear of the latch members 26 as shown in Fig. 2. The specific securing means illustrated in the drawings are merely of an exemplary nature and may be varied in almost any manner without affecting the operation of the coupling assembly.

*Operation*

As has been stated above, the normal rest position of the latch members 26 and cam plate 44 is that disclosed in Figs. 3 and 4, the latch members and the cam plate having been moved into this position by the action of the respective springs 62 and 28. To couple coupling member 38 to casing 10, coupling member 38 is inserted into passage 20 from the bottom, see Fig. 3, and is moved upwardly into the passage until stop collar 42 is in close proximity to the lower end of member 18. This relative position of parts finds coupling member 38 inserted into the passage a somewhat greater distance than that disclosed in Fig. 2.

With the coupling member in place as described above, casing 10 is held stationary and annular ring 58 is rotated in a counter-clockwise direction from the position shown in Fig. 4 to the position shown in Fig. 5. Due to the configuration of the respective cam surfaces 46, this rotation of cam plate 44 pivots the respective latch members 26 inwardly toward the axis of passage 20 and when the cam plate has been moved so that surface 50 engages the side of latch members 26, tooth portions 32 of latch members 26 have been moved into position beneath shoulder 36 on coupling member 38. Ring 58 is manually held in the position shown in Fig. 5 and retaining member 70 is moved downwardly over the upper ends of the respective latch members to engage shoulder 74 with the wall of counterbore 72 in member 70. Once the latch members have been engaged by retaining member 70, annular member 58 may be released and will return, under the influence of springs 62, to the rotative position shown in Fig. 4. Latch members 26 will be retained in the position shown in Fig. 5 since retaining member 70 prohibits the latch members from pivoting outwardly under the influence of springs 24.

The foregoing operations result in a positive coupling between casing 10 and coupling member 38 which will be permanently maintained until retaining member 70 is lifted free of latch members 26. Thus, the coupling assembly maintains its coupled condition throughout the various subsequent handling operations.

After the separable coupling elements have been respectively connected to the parachute and the load, the coupling assembly is ready to perform its desired function. When the load is initially dropped from the airplane, retaining member 70 maintains the coupled connection between the load and the parachute until the parachute has opened a sufficient amount to substantially completely support the load therefrom.

At this time, retaining member 70 is lifted, by line 88, free from latch members 26 and the coupling assembly is in the position shown in Fig. 2. Springs 28 are biasing latch members 26 toward the release position clear of passage 20. However, the load exerted between the actual load and the parachute applies a biasing action which acts in an opposite direction and thus prevents uncoupling of the load from the parachute at this time.

The action of the load may be considered as a force tending to withdraw coupling member 38 from the lower end of passage 20 while casing 10, and therefore member 18, are held stationary. The force exerted by the load is exerted beneath shoulder 36 and, as will be noted from the drawings, such a force is applied in a generally vertical direction which, if projected, would pass inside of pivot end 24. Thus, the force tending to withdraw coupling member 38 from passage 20 exerts a force upon latch members 26 which tends to pivot the latch members toward the axis of the passage 20, thus actually increasing the intensity of engagement between latch members 26 and coupling member 38 in direct proportion to the force tending to withdraw coupling member 38 from passage 20.

The releasing action of the coupling assembly may be regulated in two separate manners or by a combination of both. The first involves the biasing force exerted by the spring 28. If the biasing action of spring 28 is increased sufficiently, the force tending to rotate latch member 26 away from the axis of passage 20 will eventually achieve a magnitude which will lift coupling member 38 upwardly, thereby permitting tooth portion 32 to rotate outwardly from beneath shoulder 36 to the coupling member release position.

The second manner of regulating the releasing action involves the selection of the angle of inclination of shoulder 36 to the axis of passage 20. In the disclosed embodiment, this angle is shown as being inclined inwardly and upwardly with respect to the axis. Due to this inclination, the downward force exerted by the load in attempting to withdraw coupling member 38 from passage 20 exerts a force tending to pivot latch member 26 inwardly which might be said to have two components. The first of these components may be represented by the rotative force due to the lever arm presented by the radial offsetting of the point of engagement of coupling member 38 and the pivotal axis of latch member 26. The second component is a radially directed force which arises from the angle at which shoulder 36 is inclined with respect to the axis of passage 20. While changing of the angle of inclination of shoulder 36 has little influence upon the first of the aforementioned components, since the lever arm does not change, it will be readily appreciated that the changing of the angle of inclination has a substantial effect upon the second component. If, for example, the surface of shoulder 36 were to lie in a horizontal plane, the second component would be reduced to zero.

Thus, by suitably selecting the angle of inclination of shoulder 36 and the strength of spring 28, a predetermined load may be calculated at which the biasing action of spring 28 is just equal to the opposite biasing action exerted by the load tending to withdraw coupling member 38 from passage 20. By comparing this predetermined load with the actual load to be handled by the parachute, the coupling may be conditioned to release or uncouple the load with almost any preselected degree of sensitivity.

As the load is lowered to the ground by the parachute, when the load engages the ground, the force tending to withdraw coupling member 38 from passage 20 is obviously reduced. As the reduction in force passes the predetermined minimum uncoupling load, latch members 26 may be pivoted, by springs 28, outwardly away from the axis of passage 20 thus disengaging tooth portions 32 from shoulder 36. Under these conditions, subsequent forces of separation act to withdraw coupling member 38 from passage 20, thus disconnecting the load from the parachute and preventing the parachute from dragging the load over the ground.

While I have disclosed but a single embodiment of my invention, it will be readily apparent to those skilled in the art that certain of the structural details illustrated in the drawings may be varied without departing from the true scope of my invention. Therefore, the foregoing description is to be considered exemplary rather than limiting and the true scope of my invention is that defined in the following claims.

What I claim is:

1. A coupling assembly comprising a casing having a passage extending inwardly from an opening at one end of said casing, latch members located within said casing on opposed sides of said passage, means pivotally mounting said latch members on said casing adjacent said one end of said passage for pivotal movement between a latching position wherein said latch members project into said passage at a location spaced inwardly of said casing from the pivotal mounting means and a release position wherein said latch members are located clear of said passage, a coupling member insertable into said passage through said opening, means on said coupling member engageable with said latch members when in said latching position and operable to maintain said latch members in latching engagement with said coupling member when a force tending to withdraw said coupling member from said passage is exerted, and means biasing said latch members toward said release position.

2. A coupling assembly comprising a casing having a passage extending inwardly from an opening at the lower end of said casing, latch members located within said casing on opposed sides of said passage, a tooth on each of said latch members, means pivotally supporting the lower ends of said latch members on said casing adjacent the lower end of said passage, said latch members being movable about said pivotal means between a latching position wherein the teeth on said latch members project into said passage at a location above the pivotal support means and a release position wherein the teeth on said latch members are located clear of said passage, a coupling member insertable into said passage through said opening, a downwardly facing shoulder on the upper end of said coupling member engageable with the teeth on said latch members when in said latching position to maintain said teeth in latching engagement with said coupling member when a force tending to withdraw said coupling member from said passage is exerted, and means biasing said latch members toward said release position.

3. A coupling assembly as recited in claim 2 including means for maintaining said teeth in latching engagement with said coupling member independently of said engageable means on said coupling member.

4. A coupling assembly as recited in claim 2 including cam means mounted on said casing and engageable with said latch members to move said latch members into said latching position.

5. A coupling assembly comprising a casing having a passage extending inwardly and upwardly from an opening at the lower end of said casing, latch members located within said casing on opposed sides of said passage, said latch members having upper ends and lower ends, an upwardly inclined tooth on each of said latch members adjacent the upper end thereof, pivotal means at the lower ends of said latch members mounting said latch members on said casing adjacent the lower end of said passage, the upper ends of said latch members being movable about said pivotal means between a latching position wherein the teeth on said latch members project into said passage and a release position wherein the teeth on said latch members are located clear of said passage, an elongated coupling member insertable upwardly into said passage through said opening, downwardly facing shoulders on said coupling member inclined inwardly toward and upwardly with respect to the longitudinal axis of said coupling member, said inclined teeth on said latch members being constructed to abut said shoulders on said coupling member in face to face engagement when said latch members are in said latching position, and spring means biasing said latch members to said release position.

6. A coupling assembly as recited in claim 5 including means engageable with said latch members independently of the engagement of said teeth and said shoulders to maintain said latch members in said latching position.

7. A coupling assembly as recited in claim 5 including cam means mounted on said casing and engageable with said latch members to move said latch members from said release position to said latching position.

8. A coupling assembly comprising a base having a central opening therethrough, a hollow tubular member projecting upwardly from said base and defining a passage extending upwardly from said opening, said tubular member having slots passing through the wall thereof at locations spaced above said base, a plurality of latch members located around the exterior of said tubular member, means mounting each of said latch members upon said base for movement between a release position at the exterior of said tubular member and a latching position wherein said latch members project through said slots into the interior of said tubular member, a coupling member insertable through said opening into said passage, means on said coupling member engageable with said latch members to maintain said latch members in said latching engagement with said coupling member when a force tending to withdraw said coupling member from said passage is exerted, and resilient means for moving said latch members to said release position when the force tending to withdraw said coupling member from said passage falls below a predetermined minimum force.

References Cited in the file of this patent

UNITED STATES PATENTS

| | | |
|---|---|---|
| 1,845,466 | Williams | Feb. 16, 1932 |
| 2,406,010 | Frieder et al. | Aug. 20, 1946 |
| 2,521,516 | Heidman et al. | Sept. 5, 1950 |
| 2,729,495 | Dejean | Jan. 3, 1956 |